April 1, 1952  F. W. H. MUELLER  2,591,590
ANTISTATIC PHOTOGRAPHIC FILM
Filed Dec. 22, 1945

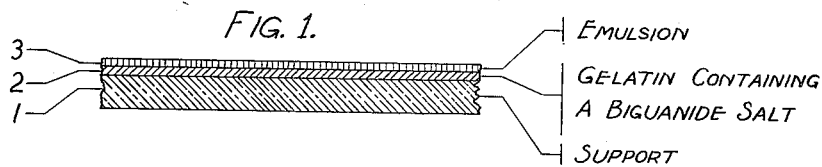

FIG. 1.
3 — EMULSION
2 — GELATIN CONTAINING A BIGUANIDE SALT
1 — SUPPORT

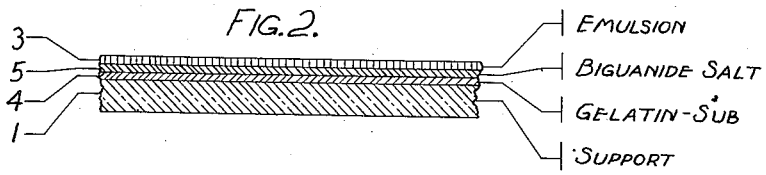

FIG. 2.
3 — EMULSION
5 — BIGUANIDE SALT
4 — GELATIN-SUB
1 — SUPPORT

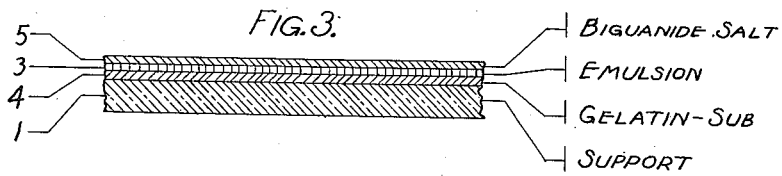

FIG. 3.
5 — BIGUANIDE SALT
3 — EMULSION
4 — GELATIN-SUB
1 — SUPPORT

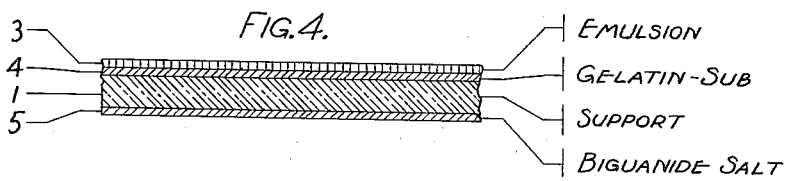

FIG. 4.
3 — EMULSION
4 — GELATIN-SUB
1 — SUPPORT
5 — BIGUANIDE SALT

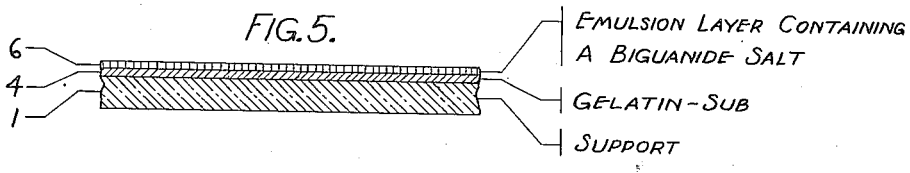

FIG. 5.
6 — EMULSION LAYER CONTAINING A BIGUANIDE SALT
4 — GELATIN-SUB
1 — SUPPORT

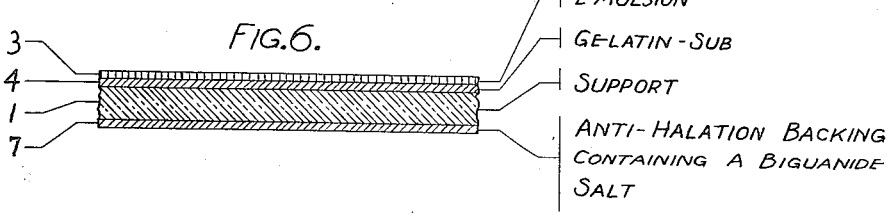

FIG. 6.
3 — EMULSION
4 — GELATIN-SUB
1 — SUPPORT
7 — ANTI-HALATION BACKING CONTAINING A BIGUANIDE SALT

INVENTOR.
FRITZ W. H. MUELLER
BY
ATTORNEYS

Patented Apr. 1, 1952

2,591,590

UNITED STATES PATENT OFFICE 2,591,590

ANTISTATIC PHOTOGRAPHIC FILM

Fritz W. H. Mueller, Binghamton, N. Y., assignor to General Aniline & Film Corporation, New York, N. Y., a corporation of Delaware Application December 22, 1945, Serial No. 636,966

9 Claims. (Cl. 95—9)

This invention relates to photographic film and more particularly to film having anti-static coatings.

Considerable difficulty has been encountered in the manufacture and use of photographic film due to the accumulation of electrical charges on the film. These electrical charges, which are known as static, develop when photographic film is handled during processing, as for example, when film sheets are separated from each other or when motion picture film is passed through a projector. The more serious difficulty is the accumulation of static in the application of the various coatings in the manufacturing process of the photographic film and in the passage of manufactured film through the camera. Manifestations of these charges are glow discharges which after development of the exposed film show up as black streaks or lines, or as irregular fogged patterns in the emulsion layer. Attempts have been made to overcome static in films by the application of substances which are electrolytes or possess hygroscopic properties. The function of these substances is to impart conductivity to the film and thus dissipate the electrical charges before their accumulation leads to local discharges. Many of these substances are incompatible with the materials which form one or more layers of the photographic film and introduce new manufacturing difficulties.

An object of the present invention is to provide means for eliminating static charges on a photographic film.

A further object is to provide means for reducing static charges in a photographic film base during coating of the sensitive silver-halide emulsion.

A still further object is to provide means for reducing static charges in a photographic film during passage through a camera or printer.

Further objects will appear hereinafter.

These objects are accomplished by the present invention by incorporating in layers of the film, or on either surface of the film, a salt of a biguanide compound represented by the following general formula:

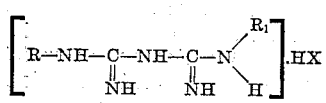

wherein R is an alkyl, aralkyl, or acyl group of at least 7 carbon atoms, e. g., heptyl, octyl, nonyl, decyl, undecyl, dodecyl, tridecyl, tetradecyl, pentadecyl, hexadecyl, heptadecyl, octadecyl, and the like, benzyl, phenyl ethyl, phenyl propyl, pheny isopropyl, phenyl butyl, phenyl amyl, and the like, benzoyl, octanoyl, palmitoyl, cinnamoyl, cumoyl, oleoyl, xyloyl, naphthoyl, stearoyl, and the like, $R_1$ is either hydrogen or an alkyl ranging from 1 to 4 carbon atoms, e. g., methyl, ethyl, propyl, isopropyl, butyl, isobutyl, and the like, and X is an anion of an inorganic acid, e. g., Cl, Br, I, $HSO_4$, $ClO_4$, and the like.

The salts of a biguanide compound, wherein R is an alkyl or aralkyl group, are prepared according to the method described in United States Patent 2,149,709. Where R is an acyl group such compounds are prepared according to the method described in British Patent 546,027.

The following are examples of salts of a biguanide compound, which for sake of convenience and brevity will be referred to hereinafter as biguanide salts, prepared in accordance with the methods given in the above references:

(1) $C_{18}H_{37}-NH-\underset{\underset{NH}{\|}}{C}-NH-\underset{\underset{NH}{\|}}{C}-NH_2 \cdot HCl$ Octadecyl biguanide hydrochloride (2) $C_{12}H_{25}-NH-\underset{\underset{NH}{\|}}{C}-NH-\underset{\underset{NH}{\|}}{C}-NH_2 \cdot H_2SO_4$ Dodecyl biguanide sulfate (3) ⟨phenyl⟩$-CH_2-NH-\underset{\underset{NH}{\|}}{C}-NH-\underset{\underset{NH}{\|}}{C}-NH_2 \cdot HBr$ Benzyl biguanide hydrobromide (4) $C_{12}H_{25}-NH-\underset{\underset{NH}{\|}}{C}-NH-\underset{\underset{NH}{\|}}{C}-N\begin{smallmatrix}CH_3\\H\end{smallmatrix} \cdot HCl$ N-dodecyl-N'-methyl-biguanide hydrochloride (5) $C_{11}H_{23}-CO-NH-\underset{\underset{NH}{\|}}{C}-NH-\underset{\underset{NH}{\|}}{C}-NH_2 \cdot HCl$ Lauroyl biguanide hydrochloride (6) $C_7H_{15}-CO-NH-\underset{\underset{NH}{\|}}{C}-NH-\underset{\underset{NH}{\|}}{C}-NH_2 \cdot HBr$ Octanoyl biguanide hydrobromide (7) $C_{11}H_{23}-CO-NH-\underset{\underset{NH}{\|}}{C}-NH-\underset{\underset{NH}{\|}}{C}-N\begin{smallmatrix}H\\CH_3\end{smallmatrix} \cdot HCl$ N-lauroyl-N'-methyl-biguanide hydrochloride These biguanide salts may be applied to the film in various ways to eliminate static. As for example, they may be applied as a constituent of a sub-layer or as a coating over a sub-layer; to the finished film either on the obverse surface, reverse surface or to the light-sensitive emulsion; or to either surface of the exposed and processed film. The various modes of applying these esters will now be described with reference to the accompanying drawing.

In the accompanying drawing Figs. 1 to 6, inclusive, represent sectional views of a film provided with anti-static layers in accordance with the present invention.

As shown in Fig. 1, the support 1, which may be of any suitable transparent material such as a cellulose organic ester, for example, cellulose acetate, cellulose formate, cellulose propionate, cellulose butyrate, cellulose acetate-propionate, cellulose acetate-butyrate, and the like, or cellulose nitrate, or film-forming polymers, such as polyvinyl chloride, copolymers of vinyl chloride-vinyl acetate, copolymers of vinyl chloride-vinylidene chloride, polyamides, superpolymers and the like, is coated with a thin gelatin sub-layer 2 to which has been added one of the said biguanide salts. The light-sensitive emulsion layer 3 is coated directly over this gelatin sub-layer.

In the modification shown in Fig. 2, the support 1 is coated with the usual gelatin sub-layer 4 and directly over this layer is coated a solution of one of said biguanide salts 5. The light-sensitive emulsion layer 3 is coated directly over the layer 5.

In Fig. 3 the support 1 is coated with the usual gelatin sub-layer 4 and the light-sensitive emulsion layer 3. The anti-static layer 5 consisting of a solution of such biguanide salt is coated over the light-sensitive emulsion layer 3.

The anti-static layer 5 may be applied to a film support 1 opposite to that bearing the usual gelatin sub-layer 4 and light-sensitive emulsion layer 3 as shown in Fig. 4.

In Fig. 5 the support 1 is coated with the usual gelatin sub-layer 4. Over this sublayer is coated a light-sensitive emulsion layer 6 containing such biguanide salt.

In Fig. 6 the support 1 is coated with the usual gelatin sub-layer 4 and light-sensitive emulsion layer 3. The anti-halation layer 7 containing one of said biguanide salts is coated on the opposite side of the support 1.

The biguanide salts may be applied to the film either in a solvent or in a non-solvent for the film base. Where the biguanide salt is applied in admixture with a light-sensitive emulsion, or beneath the sensitive layer or over the sensitive layer it is applied either in an aqueous solution or some other suitable solvent which does not adversely affect the light-sensitive emulsion, such as for example, methyl or ethyl alcohol and the like. In employing the biguanide salts as a back-wash, they may be applied to the film base in a solvent such as methanol, acetone or a mixture thereof, or in a 1.5% solution of gelatin, or an alkali soluble resin prepared according to United States Patent 2,089,764.

The following specific examples illustrate several of the various methods of applying these biguanide salts as anti-static coatings, and it will be understood that these examples merely represent the preferred embodiments and are not to be considered as limitative.

*Example I*

12 cc. of a 5% solution of octadecyl biguanide hydrochloride in methanol are dispersed in 500 cc. of 1.5% gelatin and applied as a top layer upon a light-sensitive silver-halide emulsion.

*Example II*

0.2 gram of dodecyl biguanide sulfate is dissolved in 100 cc. of a mixture consisting of 30% methanol and 70% acetone. In this solution 0.2 gram of a resin from phenoxyacetic acid and formaldehyde, prepared according to Example 2 of United States Patent 2,089,764, is dissolved. This solution is applied directly on cellulose acetate base.

*Example III*

0.2 gram of lauroyl biguanide hydrochloride is dissolved in 100 cc. of a mixture consisting of 30% methanol and 70% acetone. The solution is applied as a back-wash directly on cellulose acetate base.

*Example IV*

100 cc. of a 10% solution of N-lauroyl-N'-methyl-biguanide hydrochloride in ethanol are added to 10 kg. silver-halide emulsion and coated upon a cellulose acetate base.

The above specific examples are to be regarded as merely illustrative of the invention, and not in any sense restrictive.

I claim:

1. A photographic element comprising a support carrying a photographic emulsion layer and an anti-static layer consisting of a colloidal carrier containing octadecyl biguanide hydrochloride.

2. A photographic element comprising a support carrying a photographic emulsion layer and an anti-static layer consisting of a colloidal carrier containing dodecyl biguanide sulfate.

3. A photographic element comprising a support carrying a photographic emulsion layer and an anti-static layer consisting of a colloidal carrier containing lauroyl biguanide hydrochloride.

4. A photographic element comprising a support carrying a photographic emulsion layer and between said support and said emulsion layer, an anti-static layer consisting of a colloidal carrier containing a biguanide salt corresponding to the following general formula:

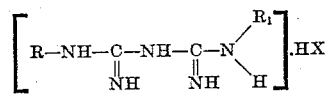

wherein R is a member selected from the class consisting of alkyl and acyl groups of at least seven carbon atoms, $R_1$ is a member selected from the class consisting of hydrogen and an alkyl group of not more than 4 carbon atoms, and X is an anion of an inorganic acid.

5. A photographic element comprising a support carrying a photographic emulsion layer and, on the opposite side, of said support, an anti-static layer consisting of a colloidal carrier containing a biguanide salt corresponding to the following general formula:

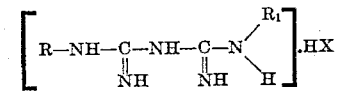

wherein R is a member selected from the class consisting of alkyl and acyl groups of at least seven carbon atoms, $R_1$ is a member selected from the class consisting of hydrogen and an alkyl group of not more than 4 carbon atoms, and X is an anion of an inorganic acid.

6. A photographic element comprising a support carrying a photographic emulsion layer and an anti-static layer consisting of a colloidal carrier containing a biguanide salt corresponding to the following general formula:

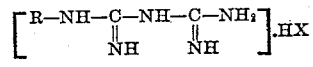

wherein R is an alkyl group of at least 7 carbon atoms, and X is an anion of an inorganic acid.

7. A photographic element comprising a support carrying a photographic emulsion layer and an anti-static layer comprising a biguanide salt corresponding to the following general formula:

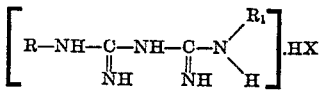

wherein R is a member selected from the class consisting of alkyl and acyl groups of at least seven carbon atoms, $R_1$ is a member selected from the class consisting of hydrogen and an alkyl group of not more than 4 carbon atoms, and X is an anion of an inorganic acid.

8. A photograhic element comprising a support carrying a photographic emulsion layer and an anti-static layer consisting of a colloidal carrier containing N-dodecyl-N'-methyl-biguanide hydrobromide.

9. A photographic element comprising a support carrying a photographic emulsion layer and an anti-static layer consisting of a colloidal carrier containing octanoyl biguanide hydrobromide.

FRITZ W. H. MUELLER.

REFERENCES CITED

The following references are of record in the file of this patent:

UNITED STATES PATENTS

| Number | Name | Date |
|---|---|---|
| 1,954,294 | Heymer | Apr. 10, 1934 |
| 2,046,067 | Gaspar | June 30, 1936 |
| 2,137,336 | Gaspar | Nov. 22, 1938 |
| 2,317,184 | Dreyfuss | Apr. 20, 1943 |
| 2,368,647 | Dreyfuss | Feb. 6, 1945 |